United States Patent [19]

Kruckenberg

[11] 3,953,452

[45] Apr. 27, 1976

[54] PERINONE DYESTUFFS

[75] Inventor: Winfried Kruckenberg, Leverkusen, Germany

[73] Assignee: Bayer Aktiengesellschaft, Leverkusen, Germany

[22] Filed: Jan. 3, 1974

[21] Appl. No.: 430,382

Related U.S. Application Data

[63] Continuation-in-part of Ser. No. 291,548, Sept. 25, 1972, abandoned, which is a continuation of Ser. No. 15,291, Feb. 27, 1970, abandoned.

[30] Foreign Application Priority Data

Mar. 1, 1969   Germany.......................... 1910586

[52] U.S. Cl............................. 260/282; 260/327 E; 260/348 A; 8/DIG. 8
[51] Int. Cl.².................................. C07D 487/02
[58] Field of Search........................... 260/282

[56] References Cited
UNITED STATES PATENTS

| 3,103,403 | 9/1963 | Eaton et al. | 260/282 |
| 3,308,127 | 3/1967 | Senshu | 260/282 |
| 3,444,172 | 5/1969 | Senshu | 260/282 |

FOREIGN PATENTS OR APPLICATIONS

| 1,962,092 | 2/1971 | Germany | 260/282 |
| 1,910,586 | 9/1970 | Germany | 260/282 |
| 1,048,374 | 1/1959 | Germany | 260/282 |

*Primary Examiner*—R. Gallagher
*Assistant Examiner*—Mark L. Berch
*Attorney, Agent, or Firm*—Plumley and Tyner

[57] ABSTRACT

Perinone dyestuffs of the formuula

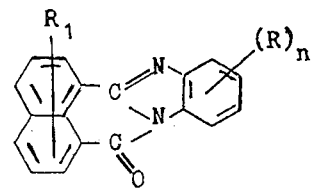

in which
R denotes alkyl, alkoxy or halogen,
$R_1$ stands for halogen, cyano, alkoxy, alkylcarbonyl, a (possibly substituted) carbonamide or carbalkoxy group, and
n represents a whole number from 0 to 3, as well as their preparation and their use for the dyeing of hydrophobic fibre materials.

6 Claims, No Drawings

PERINONE DYESTUFFS

This application is a continuation-in-part of Ser. No. 291,548 now abandoned, filed Sept. 25, 1972, which in turn is a continuation of Ser. No. 15,291 filed Feb. 27, 1970, now abandoned. The entire subject matter of said earlier applications is incorporated herein by reference.

The subject matter of the present invention is perinone dyestuffs of the general formula

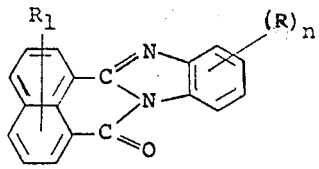

in which
R denotes alkyl, alkoxy or halogen;
$R_1$ stands for halogen, cyano, alkoxy, alkylcarbonyl, a (possibly substituted) carbonamide or carbalkoxy group; and
$n$ represents a whole number from 0 to 3,
and their production and use for the dyeing of hydrophobic fibre materials, particularly those of aromatic polyesters and synthetic polyamides.

Suitable substituents R are for example lower alkyl groups, such as methyl, ethyl, n- and i-propyl as well as n-, i- and t-butyl, lower alkoxy groups, such as methoxy, ethoxy, n- and i-propoxy, n-, i- and t-butoxy as well as

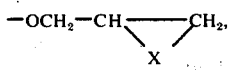

wherein X denotes an O or S atom, and halogen atoms, such as chlorine and bromine.

Suitable substituents $R_1$ are alkoxy radicals with 1–4 C atoms, alkylcarbonyl radicals with 2–5 C atoms, CN, Cl, and Br as well as preferably the radicals $-CON(Y)_2$, $-CO_2C_pH_{2p+1}$, $-CO_2C_qH_{2q}OH$,

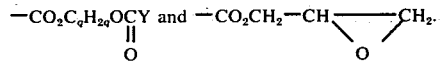

in which
Y stands for hydrogen or a lower alkyl radical with 1 to 4 C atoms,
$p$ for a whole number from 1 to 4 and
$q$ for a whole number from 2 to 4.
Preferred dyestuffs are those of the formula

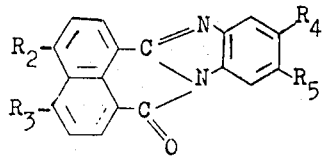

wherein one of the radicals $R_2$ and $R_3$ stands for hydrogen, the other for Cl, Br, CN, and carbalkoxy, alkoxy, alkylcarbonyl or carbonamide group and wherein one of the radicals $R_4$ and $R_5$ stands for hydrogen, the other for a (not further substituted) alkoxy group, or the radical

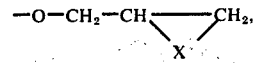

X denoting an O or S atom, as well as those dyestuffs of the formula

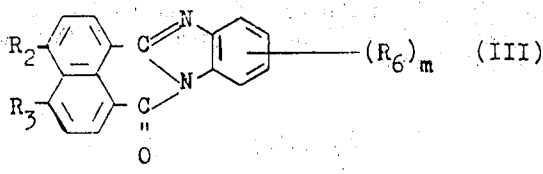

wherein one of the radicals $R_2$ and $R_3$ stands for hydrogen, the other for a (possibly substituted) carbonamide group or a substituted carbalkoxy group, $R_6$ stands for hydrogen, alkyl, alkoxy, chlorine or bromine, and $m$ represents a whole number from 0 to 2, with the proviso that if $R_6$ stands for alkoxy, $R_2$ and $R_3$ denotes a substituted carbalkoxy group.

Within the scope of the dyestuffs of the formula II, preferred in particular are those of the formula

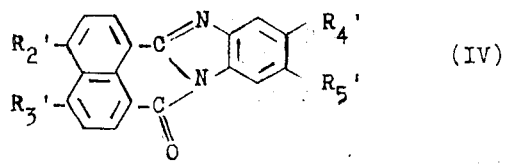

wherein one of the radicals $R_2'$ and $R_3'$ stands for hydrogen, the other for -CN or a carbalkoxy group, and wherein one of the radicals $R_4'$ and $R_5'$ stands for hydrogen, the other for a (not further substituted) alkoxy group or for the radical

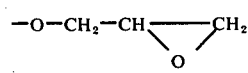

as well as those of the formula

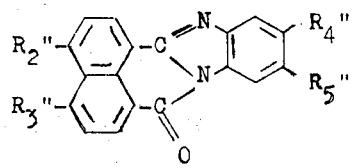

wherein one of the radicals $R_2''$ and $R_3''$ stands for hydrogen, the other for Br or Cl, and wherein one of the radicals $R_4''$ and $R_5''$ stands for hydrogen, while the other denotes the radical

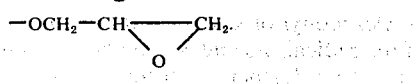

Particularly valuable dyestuffs within the scope of the compound of the formula III are those of the formula

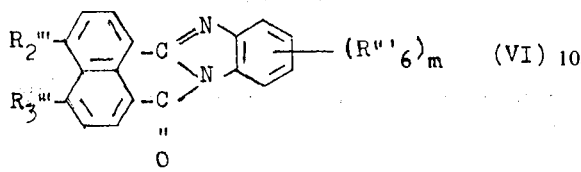

wherein one of the radicals $R_2'''$ and $R_3'''$ stands for hydrogen, the other for the group $-CON(Y)_2$ and $-CO_2C_qH_{2q}OH$,

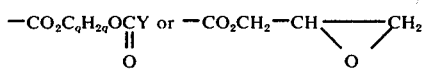

Y and q having the above-mentioned meaning, $R'''_6$ stands for hydrogen, chlorine, an alkyl or alkoxy group with, in each case, 1 to 3 C atoms, and $m$ represents a whole number from 0 to 2, with the proviso that if $R'''_6$ stands for alkoxy, $R'''_2$ or $R'''_3$ denotes a substituted carbalkoxy group.

The preparation of the new dyestuffs I takes place expediently by reaction of o-phenylene-diamines of the formula

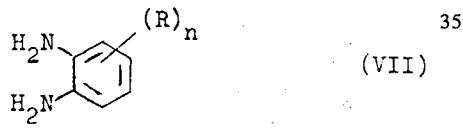

in which
R has the above-mentioned meaning with naphthalic acids or their anhydrides of the general formulae

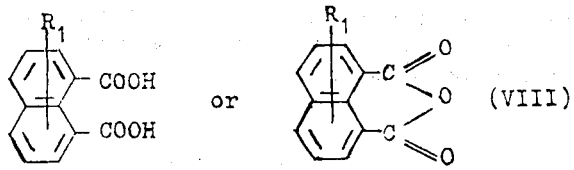

in which
$R_1$ has the above-mentioned meaning.

In the cases where $R_1$ stands for a carbonamide or carbalkoxy group, it has proved advantageous to prepare the new dyestuffs (I) in such a manner that o-phenylenediamines of the formula

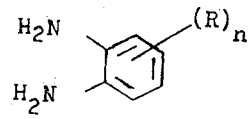

in which
R has the above-mentioned meaning are reacted with naphthalenetricarboxylic acids or their anhydrides of the general formulae

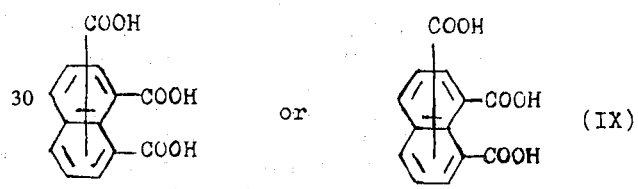

and the free carboxyl group in the reaction products is amidated or esterified in known manner.

The reaction of the o-phenylenediamines (VII) with the naphthalic acid anhydride derivatives (VIII) or (IX) takes place in general in boiling organic solvents such as pyridine, glacial acetic acid, chlorobenzene or o-dichlorobenzene or also in aqueous medium - possibly under pressure-at elevated temperature.

If, for example, a start is made from 4-carbomethoxy-1,8-naphthalenedicarboxylic anhydride and 3,4-diaminoanisole, the reaction according to the invention can be represented by the following reaction scheme:

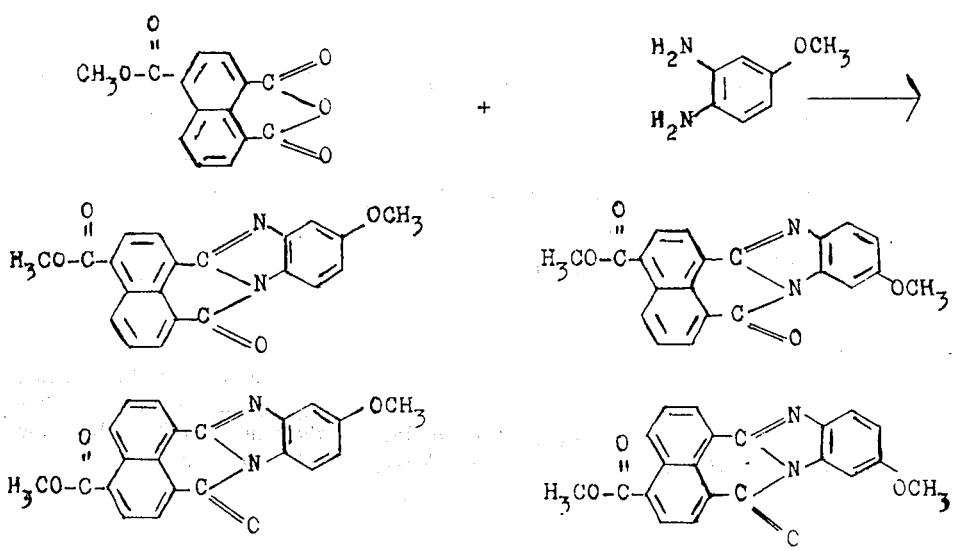

In general, the isomers mixtures obtained in this reaction are not separated.

suiteable o-phenylenediamines (VII) for the process according to the invention are for example:

o-phenylenediamine, 1,2-diamino-4-butyl-benzene, 1,2-diamino-4,6-dimethylbenzene, 1,2-diamino-4-ethoxy-benzene, 1,2-diamino-4-chloro-benzene, 1,2-diamino-4,6-dimethyl-5-chlorobenzene, 1,2-diamino-4-bromo-benzene, 1,2-diamino-4,6-diethylbenzene, 1,2-diamino-4-methoxy-6-methyl-benzene, 1,2-diamino-4-methyl-benzene and 1,2-diamino-4-epoxypropoxy-benzene.

Suitable naphthalic anhydride derivatives (VIII) are, for example:

4-cyano-, 4-bromo-, 4-chloro-, 4-methoxy-, 4-acetyl-, 4-methoxycarbonyl-, 4-ethoxycarbonyl-, 4-propoxycarbonyl-, 4-(1,2-epoxypropoxy)carbonyl-3-bromo-, 3-cyano and 3-methoxycarbonyl-1,8-naphthalene-carboxylic anhydride as well as those of the formula

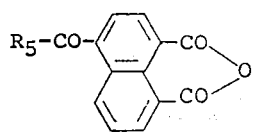

$R_5 =$ —$NH_2$, —$N(CH_3)_2$, —$N(C_3H_6)_2$, —$OC_2H_4OCHO$, —$OC_2H_4OCOCH_3$, —$OC_2H_4OCOC_3H_7$, —$OC_4H_8OCOCH_3$, —$OC_3H_6OCOC_2H_5$, —$OC_4H_8OCOC_3H_7$.

The new dyestuffs according to the invention of the formula (I) are suitable for the dyeing of hydrophobic fibre materials, particularly those of aromatic polyesters such as polyethyleneterephthalate (polyethylene glycol terephthalate) or synthetic polyamides, from aqueous liquor, greenish to orange shades with very good fastness properties being obtained. The dyestuffs of formulae IV and VI exhibit good drawing power on polyethylene terephthalate (polyethylene glycol terephthalate) and give dyeings of good sublimation fastness. The dyestuffs can, for example, in contrast to the dyestuffs described in Deutsche Auslegeschrift (Germany Published Specification) No. 1,048,374, also be dyed from aqueous-alkaline bath, which, for example, for a joint dyeing with reactive dyestuffs in the case of polyester-cotton mixed fabrics is of particular importance.

EXAMPLE 1

26.6 parts 4-carbomethoxy-1,8-naphthalenedicarboxylic anhydride, 13.8 parts 3,4-diaminoanisole and 150 parts glacial acetic acid are heated to the boil for 3 hours. The dyestuff crystallising out during cooling is filtered off with suction and dried. It dyes polyester fibre from aqueous, acidic and alkaline liquor in yellow shades.

EXAMPLE 2

36.5 parts dyestuff, (prepared as described in Example 1 from 27.7 parts 4-bromo-1,8-naphthalenedicarboxylic anhydride and 12.4 parts 3,4-diaminophenol) are introduced, with stirring, into 300 parts methanol which contain 5.5 parts sodium methylate. The methanol is then distilled off, the dry dyestuff is introduced into 100 parts epichlorohydrin, the mixture is kept at 120°C for 2 hours, with stirring, the epichlorohydrin is distilled off in a vacuum and the residue is first washed with a little acetone, then with water, and dried. The dyestuffs so obtained dyes polyester and polyamide fibre in greenish yellow shades with good fastness.

In the same manner, valuable dyestuffs are also obtained when, instead of the starting materials stated above, the starting materials given in the following Table are used. The dyestuffs dye polyester and polyamide materials in the stated shades with good fastness.

TABLE

| 1,8-naphthalenedicarboxylic acid derivative | o-phenylenediamine derivative | Shade |
|---|---|---|
| NC—[naphthalene]—(C=O)₂O | H₂N—[benzene]—OCH₂—CH—CH₂ (epoxide) | orange |
| NC—[naphthalene]—(C=O)₂O | H₂N—[benzene]—OCH₂—CH—CH₂ (episulfide) | orange |
| CH₃OOC—[naphthalene]—(C=O)₂O | H₂N—[benzene]—OC₂H₅ | yellow |
| C₃H₇OOC—[naphthalene]—(C=O)₂O | H₂N—[benzene]—OC₃H₇, HN | yellow |
| CH₃OOC—[naphthalene]—(C=O)₂O | H₂N—[benzene]—OCH₂—CH—CH₂ (epoxide) | yellow |

TABLE-continued

| 1,8-naphthalenedicarboxylic acid derivative | o-phenylenediamine derivative | Shade |
|---|---|---|
| 5-Br-1,8-naphthalic anhydride | 4-(2,3-epoxypropoxy)-o-phenylenediamine | yellowish orange |
| 4-Br-1,8-naphthalic anhydride | 4-methoxy-o-phenylenediamine | yellowish orange |
| 5-CN-1,8-naphthalic anhydride | 4-(2,3-epoxypropoxy)-o-phenylenediamine | orange |
| 4-Cl-1,8-naphthalic anhydride | 4-(2,3-epoxypropoxy)-o-phenylenediamine | yellow |
| 5-(glycidyloxycarbonyl)-1,8-naphthalic anhydride | 4-methoxy-o-phenylenediamine | yellow |
| 5-(glycidyloxymethylcarbonyl)-1,8-naphthalic anhydride | 4-(2,3-epoxypropoxy)-o-phenylenediamine | yellow |
| 5-(methoxycarbonyl)-1,8-naphthalic anhydride | 4-(2,3-epoxypropoxy)-o-phenylenediamine | orange |
| 4-methoxy-1,8-naphthalic anhydride | 4-(2,3-epoxypropoxy)-o-phenylenediamine | yellow |
| 5-methoxy-1,8-naphthalic anhydride | 4-(2,3-epoxypropoxy)-o-phenylenediamine | yellow |
| 5-(N,N-dimethylcarbamoyl)-1,8-naphthalic anhydride | 4-methoxy-o-phenylenediamine | yellow |

Le A 12 109

EXAMPLE 3

26.9 parts 4-dimethylcarbonamido-1,8-naphthalenedicarboxylic anhydride, 13.6 parts 3,4-diaminoxylene-1,5 and 150 parts glacial acetic acid are heated to the boil for 3 hours. The dyestuff crystallising out during cooling is filtered off with suction and dried. It dyes polyester fibres from aqueous, acidic and alkaline liquor in yellow shades.

EXAMPLE 4

The acid dyestuff obtained in the same manner from 24.2 parts naphthalenetricarboxylic acid-1,4,8 and 13.6 parts 3,4-diaminoxylene-1,5 is converted with dilute solution of sodium hydroxide into the sodium salt, dried, introduced into 100 parts glycolchlorohydrin, heated under reflux for about 3 hours until the dyestuff is dissolved, then poured into water, filtered off with suction and dried. This dyestuff can then preferably be further heated with acetic anhydride and again be introduced into water, suction filtered and dried.

There are so obtained two dyestuffs which, from aqueous, acidic or alkaline liquor, dye polyester fibre in greenish yellow shades.

In the same manner, valuable dyestuffs are also obtained when, instead of the starting materials stated above, the following ones are combined in the stated manner most favourable in each case. The shades obtained lie between greenish and reddish yellow.

Table

| 1,8-naphthalenedicarboxylic acid derivative | o-phenylenediamine derivative | Colour |
|---|---|---|
| CH₂-Cl-CH₂OC-[naphthalene dianhydride] | H₂N, H₂N-phenyl with two CH₃ | yellow |
| " | H₂N, H₂N-phenyl | yellow |
| " | H₂N, H₂N-phenyl-CH₃ | yellow |
| HOC₂H₄OC-[naphthalene dianhydride] | H₂N, H₂N-phenyl-OC₂H₅ | yellow |
| HOC₄H₈OCO-[naphthalene dianhydride] | H₂N, H₂N-phenyl-Cl | yellow |
| " | H₂N, H₂N-phenyl | yellow |
| " | H₂N, H₂N-phenyl with two CH₃ | yellow |
| CH₃COC₂H₄OC-[naphthalene dianhydride] | H₂N, H₂N-phenyl with two CH₃ | yellow |

Table -continued

| 1,8-naphthalenedicarboxylic acid derivative | o-phenylenediamine derivative | Colour |
|---|---|---|
| 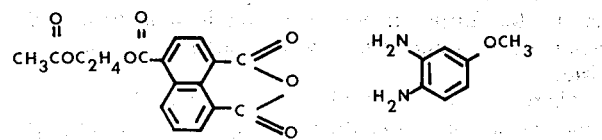 | 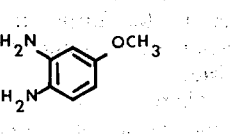 | yellow |
|  | 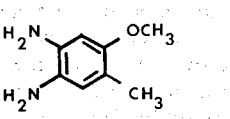 | yellow |
| 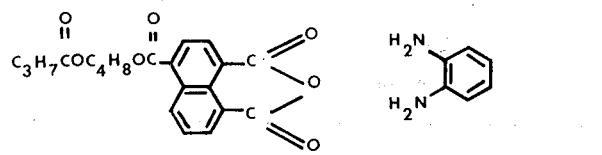 | 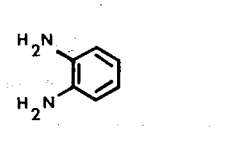 | yellow |
| " " | 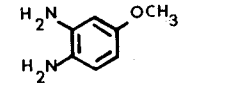 | yellow |
| " " | 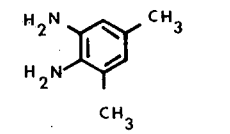 | yellow |

I claim:
1. Perinone dyestuff having the formula

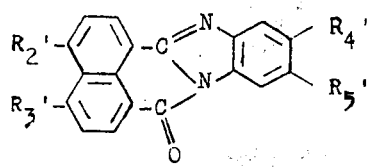

in which
one of $R_2'$ and $R_3'$ is hydrogen and the other —CN or —$CO_2C_pH_{2p+1}$;
one of $R_4'$ and $R_5'$ is hydrogen and the other $C_1$—$C_4$-alkoxy or

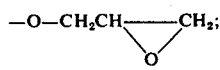

and
P is a whole number from 1 to 4.

2. The dyestuff of claim 1 in which one of $R_2'$ and $R_3'$ is carbomethoxy and the other of $R_2'$ and $R_3'$ is hydrogen; and one of $R_4'$ and $R_5'$ is methoxy and the other of $R_4'$ and $R_5'$ is hydrogen.

3. The dyestuff of claim 1 in which one of $R_2'$ and $R_3'$ is carbomethoxy and the other of $R_2'$ and $R_3'$ is hydrogen; and one of $R_4'$ and $R_5'$ is ethoxy and the other of $R_4'$ and $R_5'$ is hydrogen.

4. The dyestuff of claim 1 in which one of $R_2'$ and $R_3'$ is carbopropoxy and the other of $R_2'$ and $R_3'$ is hydrogen; and one of $R_4'$ and $R_5'$ is propoxy and the other of $R_4'$ and $R_5'$ is hydrogen.

5. The dyestuff of claim 1 in which one of $R_2'$ and $R_3'$ is carbomethoxy and the other of $R_2'$ and $R_3'$ is hydrogen; and one of $R_4'$ and $R_5'$ is

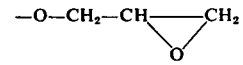

and the other of $R_4'$ and $R_5'$ is hydrogen.

6. A dyestuff of the formula

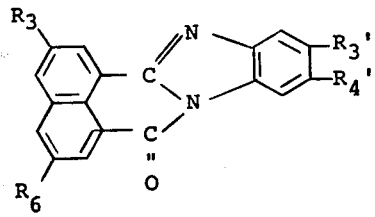

in which one of $R_3$ and $R_6$ is carbomethoxy and the other of $R_3$ and $R_6$ is hydrogen; and one of $R_3'$ and $R_4'$ is

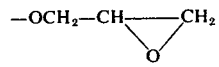

and the other of $R_3'$ and $R_4'$ is hydrogen.

* * * * *